(12) United States Patent
Kanfer et al.

(10) Patent No.: US 10,949,488 B1
(45) Date of Patent: Mar. 16, 2021

(54) IMAGE QUALITY OPTIMIZATION DURING REMOTE ISOLATED SESSIONS

(71) Applicant: CA, Inc., San Jose, CA (US)

(72) Inventors: Amit Kanfer, Netanya (IL); Yoav Horman, Tel Aviv-Jaffa (IL)

(73) Assignee: CA, Inc., San Jose, CA (US)

( * ) Notice: Subject to any disclaimer, the term of this patent is extended or adjusted under 35 U.S.C. 154(b) by 0 days.

(21) Appl. No.: 16/024,492

(22) Filed: Jun. 29, 2018

(51) Int. Cl.
| | | |
|---|---|---|
| *G06F 16/957* | (2019.01) | |
| *G06F 40/197* | (2020.01) | |
| *G06F 40/14* | (2020.01) | |
| *G06F 40/146* | (2020.01) | |
| *H04L 29/08* | (2006.01) | |

(52) U.S. Cl.
CPC .......... *G06F 16/9577* (2019.01); *G06F 40/14* (2020.01); *G06F 40/146* (2020.01); *G06F 40/197* (2020.01); *H04L 67/10* (2013.01)

(58) Field of Classification Search
CPC ............. G06F 16/9577; G06F 17/2247; G06F 17/2252; G06F 17/2288
See application file for complete search history.

(56) References Cited

U.S. PATENT DOCUMENTS

| | | | | |
|---|---|---|---|---|
| 9,037,975 B1* | 5/2015 | Taylor | ................. | G06F 16/9577 715/733 |
| 9,639,629 B1* | 5/2017 | Venkat | ................ | H04L 67/2847 |
| 2004/0194023 A1* | 9/2004 | Wiechers | ............ | G06F 16/9577 715/234 |
| 2007/0294333 A1* | 12/2007 | Yang | .............. | H04N 21/234327 709/203 |
| 2012/0054616 A1* | 3/2012 | Mittal | .............. | H04N 21/41407 715/722 |
| 2015/0310126 A1* | 10/2015 | Steiner | ................... | G06F 40/14 715/204 |
| 2016/0155429 A1* | 6/2016 | Matsui | ...................... | G06T 1/60 345/555 |
| 2017/0116349 A1* | 4/2017 | Steiner | ................ | G06F 16/9574 |
| 2017/0289267 A1* | 10/2017 | Eschbach | .............. | H04L 67/142 |
| 2018/0032491 A1* | 2/2018 | Heo | ....................... | G06F 17/212 |

* cited by examiner

*Primary Examiner* — Scott T Baderman
*Assistant Examiner* — Seung Woon Jung
(74) *Attorney, Agent, or Firm* — Shook, Hardy & Bacon L.L.P.

(57) ABSTRACT

Image quality optimization during remote isolated sessions. In one embodiment, a method may include a remote isolation server receiving, at a remote isolation server, a request from a local browser on a local network device to obtain webpage data from a webserver, requesting, from the webserver, the webpage data, receiving, from the webserver, the requested webpage data, rendering a first image of the requested webpage data, storing a first copy of the first image of the requested webpage data in memory associated with the remote isolation server, compressing a first portion of the first image using a first compression method, sending, from the remote isolation server, the compressed first portion of the first image to the local browser, compressing a second portion of the first image using a second compression method, and sending the compressed second portion of the first image to the local browser.

19 Claims, 5 Drawing Sheets

IMAGE QUALITY OPTIMIZATION DURING REMOTE ISOLATED SESSIONS

BACKGROUND

A webpage is a document written in a standard markup language that is typically downloaded to a local network device over the World Wide Web of the Internet from a webserver. Once downloaded, the webpage is then rendered to a user of the local network device in an application known as a web browser (or simply a "browser"). When a webpage that was downloaded from a webserver is rendered in a browser, the webpage may have sub-resources that are downloaded from other third-party webservers (such as ad network webservers, Content Distribution Network webservers, third party analytics webservers, etc.). Further, webpages may include dynamic content, such as animations, videos, and links that are displayed in the webpage. Browsers may be configured to employ many different technologies and programming languages and may also be configured to execute executable content (that is downloaded as part of a webpage or from third-party webservers) during the rendering of the webpage. Allowing a browser to execute executable content may add dynamic functionality to the webpage, thus making the webpage more useful to a user.

In the infancy of the Internet and World Wide Web most webpages were simple and included text and perhaps some images. In more recent years, webpage content has come to include more complex elements. A standard webpage may not only include HTML (Hypertext Markup Language), but also may include different Fonts, CSS (Cascading Style Sheets), SVG (Scalable Vector Graphics), scripts or other executable content, different plugins such as Flash, and video and/or audio content.

As webpages have become more complex (and more common in daily use), webpages have also become increasingly used by malicious actors to infect (e.g., in the form of malware, ransom-ware, viruses, phishing attacks using malicious links or attachments sent via email, drive by downloads, zero day browser exploits, etc.) computers that are used by users. The malicious code can be embedded in scripts (e.g., JavaScript, VBScript) of a webpage, plugins (e.g., Java, Flash) that are used by a webpage, or even within the images or video content that is part of a webpage (e.g., by taking advantage of how such content is handled by the local browser).

Malware, therefore, may be included with the downloaded content, resulting in potential infection of the user's computing system. For example, a purveyor of a computer virus may embed the virus as malicious content in a downloadable image of a webpage in an attempt to compromise a local network device with the virus.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for image quality optimization during remote isolated sessions may be performed, at least in part, by a remote isolation server including one or more processors. The method may include (a) intercepting, at a remote isolation server, a request from a local browser on a local network device to obtain webpage data from a webserver, (b) requesting, from the webserver, the webpage data, (c) receiving, from the webserver, the requested webpage data, (d) rendering a first image of the requested webpage data, (e) storing a first copy of a first image of the requested webpage data in memory associated with the remote isolation server, (f) compressing a first portion of the first image using a first compression method, (g) sending, from the remote isolation server, the compressed first portion of the first image to the local browser, (h) compressing a second portion of the first image using a second compression method, and (i) sending the compressed second portion of the first image to the local browser.

In some embodiments, rendering the first image may include rendering a bitmap image of the webpage data. In some embodiments, prior to rendering the first image, the method may further include executing any executable content contained in the webpage data. In some embodiments, the first compression method and the second compression method may be different compression methods. In these embodiments, the first compression method may be a lossy compression method and the second compression method may be a lossless compression method. In these embodiments, the lossy compression method may produce a JPG file, whereas the lossless compression method may produce a PNG file.

In some embodiments, prior to sending the first compressed image to the local browser, the method may further include determining that a congestion level of a wireless communication link between the remote isolation server and the local network device satisfies a pre-determined threshold. In these embodiments, sending the compressed first portion of the first image may be based on determining the congestion level satisfies the pre-determined threshold.

In some embodiments, in response to a trigger communication received from the local browser, the method may further include compressing a third portion of the first image using the second compression method, and sending the compressed third portion of the first image to the local browser.

In some embodiments, the method may further include updating the first copy of the first image after compressing the first image and compressing the first portion of the first image and compressing the second portion of the first image, and storing the updated first copy in the memory associated with the remote isolation server.

In another embodiment, a computer-implemented method for image quality optimization during remote isolated sessions may be performed, at least in part, by a local browser on a local network device. The method may include sending a request to obtain webpage data from a webserver, receiving a first portion of a first image of the requested webpage data from a remote isolation server, the first portion of the first image compressed by a first compression method, decompressing the first portion of the first image, receiving a second portion of the first image of the requested webpage data from the remote isolation server, the second portion of the first image compressed by a second compression method, decompressing the second portion of the first image, and replacing a region of the first portion of the first image with the second portion of the first image corresponding to the region of the first portion of the first image.

In some embodiments, the method may also include detecting a user input at the local browser, wherein the user input requests a different portion of the webpage data than the first portion of the first image and the second portion of the first image. In these embodiments, detecting the user input may include detecting one or more of mouse input, keyboard input, and touchscreen input.

In some embodiments, the method may further include receiving a third portion of the first image from the remote isolation server based on an expiration of a timer or based on detecting the user input, with the third portion of the first image being compressed by one of the first compression method and the second compression method. In these embodiments, if the third portion of the first image is compressed by the second compression method, the method may further include replacing a second region of the first portion of the first image with the third portion of the first image corresponding to the second region of the first portion of the first image.

In some embodiments, the first portion of the first image received by the browser may be compressed using a lossy compression method and may be decompressed appropriately. In some embodiments, the second portion of the first image received by the browser may be compressed using a lossless compression method and may be decompressed appropriately.

Also, in some embodiments, one or more non-transitory computer-readable media may include one or more computer-readable instructions that, when executed by one or more processors of a remote isolation server, cause the remote isolation server to perform a method for image quality optimization during remote isolated sessions.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

The potential for executable content to be malicious may present a security threat to a local network device on which a browser is executing. One solution for avoiding this security threat involves sandboxing where executable content is executed in a sandbox in the browser to attempt to prevent any malicious content from harming the local network device on which the browser is executing. Unfortunately, however, sandboxing methods generally fail due to difficulties in sandboxing all executable content in image files, video streams of a webpage, or other linkable content and/or difficulties in accurately identifying and sandboxing all executable content of a webpage that is malicious.

Another solution for avoiding potential security threats involves remote webpage browsing. One method of remote webpage browsing is to remotely render the webpage on a secure remote network device where malicious executable code cannot damage a local network device, and then only send images of the remotely-rendered webpage from the remote network device to the browser on the local network device. Using this method, when a user enters input into the webpage displayed in the browser, those inputs are transmitted to the remote network device and the webpage is again remotely rendered and images are again sent to the browser. This method of remote webpage browsing is generally too slow and has too much delay in responsiveness to user input to be acceptable for users.

Thus, some embodiments disclosed herein may enable image quality optimization during remote isolated sessions. In the described remote isolation system, the system may prepare and send remotely rendered images and portions of images of a requested webpage to a browser for viewing. The images may be sent as a way to selectively "beautify" the images viewed on the browser, while mitigating the potential of security risks and enabling faster remote rendering with higher quality images.

Figure 1:
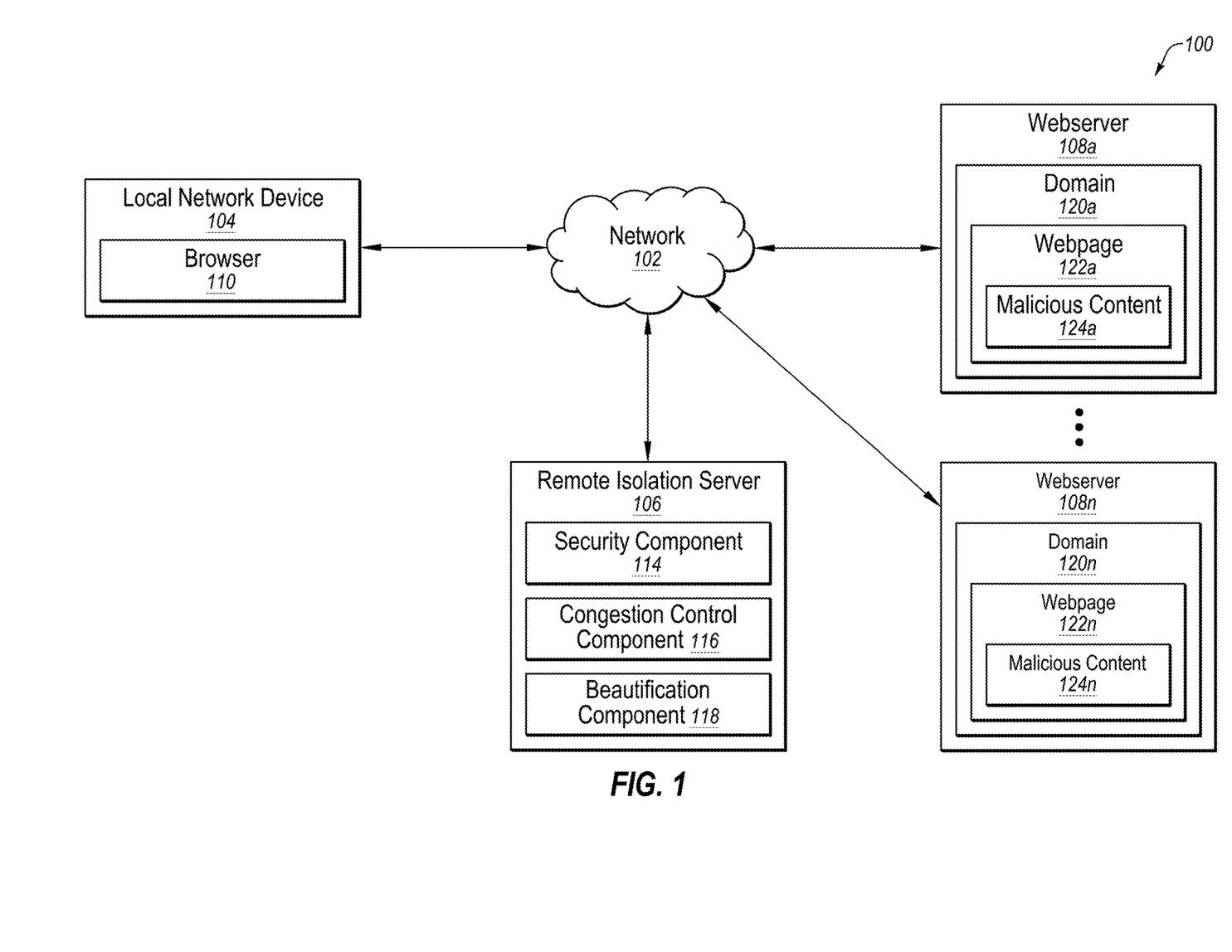
FIG. 1 illustrates an example system configured for image quality optimization during remote isolated sessions.

Turning to the figures, FIG. 1 illustrates an example system 100 configured for image quality optimization during remote isolated sessions. The system 100 may include a network 102, a local network device 104, a remote isolation server 106, and webservers 108a-108n.

In some embodiments, the network 102 may be configured to communicatively couple the local network device 104, the remote isolation server 106, and the webservers 108a-108n to one another using one or more network protocols, such as the network protocols available in connection with the World Wide Web. In some embodiments, the network 102 may be any wired or wireless network, or combination of multiple networks, configured to send and receive communications (e.g., via data packets) between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
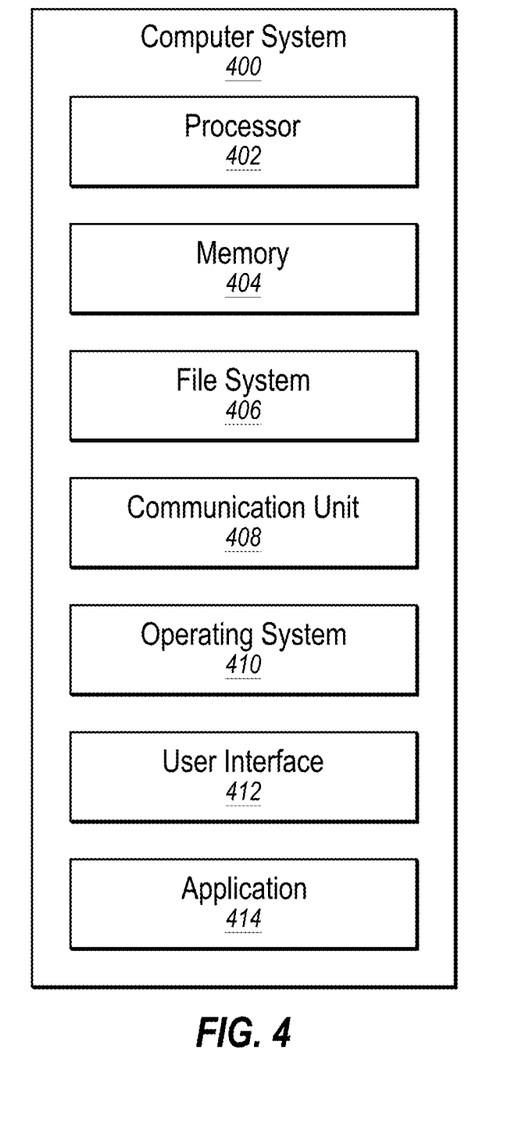
FIG. 4 illustrates an example computer system that may be employed in image quality optimization during remote isolated sessions.

In some embodiments, the webservers 108a-108n may each be any computer system capable of communicating over the network 102 and capable of hosting webpages addressable at a particular web domain, examples of which are disclosed herein in connection with the computer system 400 of FIG. 4. The webservers 108a-108n may be addressable on domains 120a-120n and may host webpages 122a-122n, respectively. The webpages 122a-122n may include, among other things, text, static images, dynamic images, links and/or videos that may include embedded executable content, including malicious content 124a-124n. Each of the malicious content 124a-124n may be, for example, an executable file or executable script in a scripting language such as VBScript, AngularJS, JQuery, Bootstrap, AJAX, JScript, and ActionScript. The malicious functionality of the malicious content may include, for example, functionality typical of a spyware, a virus, a worm, a logic bomb, a trapdoor, a Trojan horse, a Remote Admin Trojan (RAT), a malware, a mobile malicious code, a malicious font, and a rootkit, or some combination thereof.

In some embodiments, the local network device 104 may be any computer system capable of communicating over the network 102 and executing a browser, examples of which are disclosed herein in connection with the computer system 400 of FIG. 4. The local network device 104 may include a browser 110. The browser 110 may be configured to render webpages, such as the webpages 122a-122n, to a user of the local network device 104. The browser 110 may be further configured to display, among other things, text, static images, dynamic images, link, and/or video in webpages to a user of the local network device 104. In some embodiments, the browser 110 may be a standard off-the-shelf web browser such as, but not limited to, Google Chrome, Mozilla Firefox, Safari, Internet Explorer, or Microsoft Edge.

In some embodiments, the remote isolation server 106 may be any computer system, or combination of multiple computer systems, capable of communicating over the network 102 and capable of monitoring the local network device 104 in order to protect the local network device 104 from malicious content, examples of which are disclosed herein in connection with the computer system 400 of FIG. 4.

In a traditional environment, a local network device such as the local network device 104 may make requests for webpages to the webservers 108a-108n and responses (e.g., in the form of webpage content) may be delivered directly to the local network device 104. In contrast, however, in some embodiments disclosed herein requests from the local network device 104 are routed through the remote isolation server 106, which functions as an intermediary computer system (perhaps without the knowledge of the end user), and the remote isolation server 106 transmits webpage requests to the webservers 108a-108n. The webpage content of the webpages 122a-122n that is provided by the webservers 108a-108n is then routed back through the requesting remote isolation server 106. This implementation may decrease (or eliminate altogether) vulnerabilities that may be present in the webpages 122a-122n and/or the browser 110 that is designed to view such webpages using the methods described herein. For example, this implementation may eliminate vulnerabilities posed by the malicious content 124a-124n that is present in the webpages 122a-122n.

In some embodiments, the remote isolation server 106 may be employed by an organization that manages and/or protects the network 102 and/or the local network device 104, and/or any of the webservers 108a-108n. In some embodiments, the remote isolation server 106 may include a security component 114. The security component 114 may be configured to secure the local network device 104 from any malicious content found in a webpage. In some embodiments, the security component 114 may function as part of a remote isolation environment, where malicious content in webpage data can be safely transformed into rendered images that excludes the malicious content, thus protecting the local network device 104 from ever being exposed to any such malicious content. In some embodiments, the security component 114 may include, or be part of, a browser engine, such as a WebKit or Blink browser engine. Remote isolation server 106 may further include a congestion control component 116 and a beautification component 118, each of which will be explained in more detail herein. In some embodiments, the remote isolation server 106 and components thereon such as, but not limited to, the security component 114, the congestion control component 116, and the beautification component 118 may include, or be part of, a network security device or application such as Symantec Corporation's ProxySG S200/S400/S500 appliance or virtual appliance or cloud service, Symantec Corporation's Secure Web Gateway (SWG), Symantec Corporation's Secure Web Gateway Virtual Appliance (SWG VA), Symantec Corporation's Advanced Secure Gateway (ASG) S200/S400/S500, or Symantec Corporation's Web Isolation (Fireglass).

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
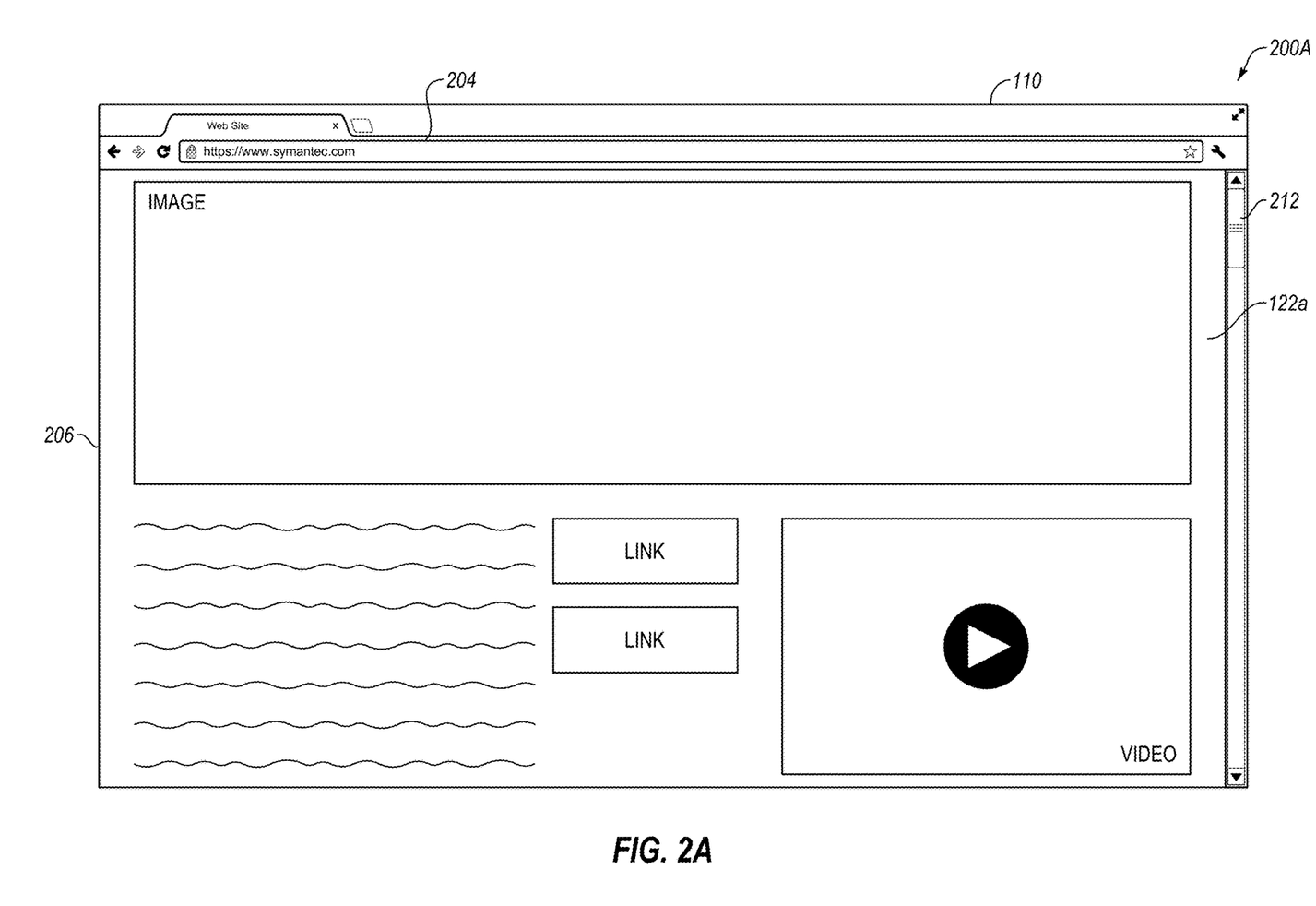
FIGS. 2A and 2B illustrate example screenshots of image quality optimization during remote isolated sessions.
Figure 2B:
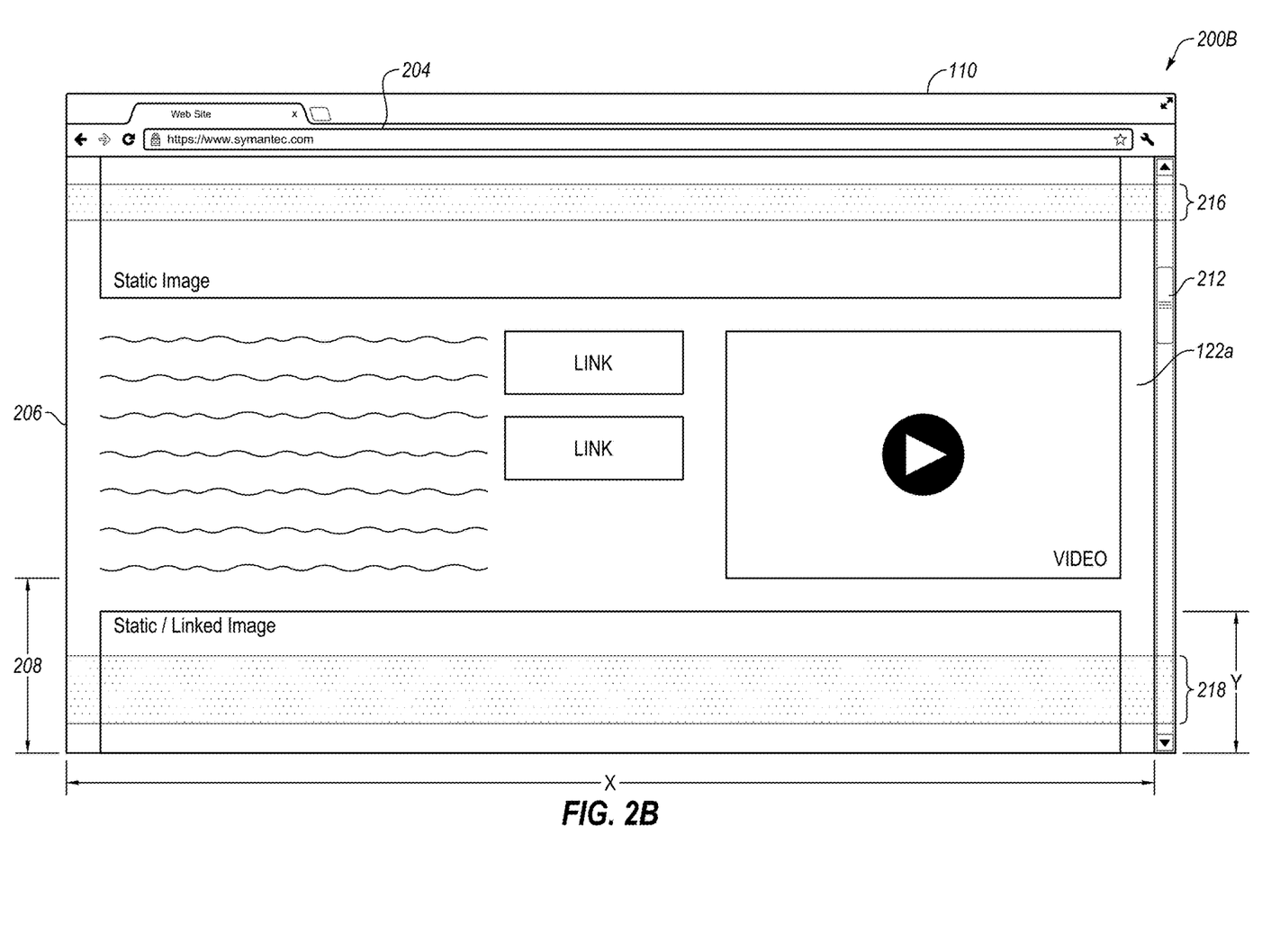

FIGS. 2A and 2B illustrate example screenshots 200A and 200B, respectively, of image quality optimization during remote isolated sessions. More specifically, FIGS. 2A and 2B illustrate screenshots of a webpage in which a visual feed of images is sent by remote isolation server 106 to browser 110 as a stream of variously compressed images for viewing on the browser 110. The screenshots 200A and 200B will now be discussed with reference to FIGS. 1 and 2A-2B.

In some embodiments, a browser 110 on a local network device 104 may request access to a webserver (e.g., one of webservers 108a-108n). For example, a user may type a URL 204 into the browser 110 on the local network device 104, such as "www.symantec.com." This URL 204 may correspond to the domain 120a and the webpage 122a hosted at the webserver 108a. In response to the user typing this URL 204 into the browser 110, the browser 110 may send a request to the webserver 108a for the webpage 122a at the domain 120a. This request, and/or the response to this request from the webserver 108a, may be intercepted by remote isolation server 106.

In order to mitigate the potential harm posed by the malicious content 124a, the remote isolation server 106 may create, compress, and transmit a full screen remotely rendered image 206 of the requested webpage 122a to browser 110, where the image 206 is free of executable content, including the malicious content 124a. The transmission of remotely rendered images, however, may cause congestion in the transfer of bytes between the webserver 108a and the browser 110, which may result in latency issues. Thus, the remote isolation server 106 may first determine whether a wireless communication link between the webserver 108a and the browser 110 is congested. Based on the congestion determination, the remote isolation server 106 may then transmit a series of remotely rendered images of the requested webpage 122a to be viewed on the browser 110 without the worry of sending executable content which may include malicious content 124a. The original image 206 sent by remote isolation server 106 may be a smaller, lower quality image, with each additional image sent being a higher quality "beautified" portion of the original image 206. Various aspects of this process are disclosed in more detail herein.

In one embodiment, the congestion control component 116 may determine a current congestion level of a wireless transmission link, such as a link between the webserver 108a and the bowser 110 (via the remote isolation server 106). In particular, the congestion control component may monitor the unacknowledged bytes sent from the any of the webservers 108a-108n to the browser 110. Thus, congestion control component 116 may also prevent bytes from being sent from any of the webservers 108a-108n to the browser 110 if the congestion level is determined to be too high for the browser 110 to receive the images from remote isolation server 106.

In some embodiments, the webpage 122a may be coded using a markup language such as HTML5. In HTML5, specific coding elements may be enabled which allow for the creation of vector graphics and bitmap images (BMPs) on the webpage 122a, including the creation of graphics in real-time. BMPs may be compressed for storage and/or for transmission between, for example, the webserver 108*a* and the browser 110 (and in some embodiments, via the remote isolation server 106).

Some browsers may support at least two main types of data compression applied to digital images (such as BMPs), in order to mitigate storage and/or transmission costs (e.g., monetary, bandwidth, latency, etc.). In some embodiments, data compression may be considered "lossy" or "lossless." A "lossy" compression format (e.g, JPG) may lose at least some of the related underlying data when the image is reconstructed after compression. The data lost may be related to some of the colors, shade, and resolution that the human eye is generally not capable of distinguishing, and thus, a lossy compression format may be appropriate for photography, but not preferred for technical drawings, text, medical imaging, etc. The resulting file size of a lossy compression format is relatively small and the compression time is relatively short compared to a "lossless" compression format.

With a "lossless" compression format (e.g., PNG), no data is lost when the image is compressed and reconstructed (i.e., the reconstructed image is exactly the same after decompression as the original image). As a result, the resulting file size is relatively large and the compression time is relatively long. Using only a lossy compression format, such as JPG, to remotely render the images and transmit the compressed images to the browser would result in a faster rendering and transmission, however, the images would continue to lose detail over time. Using only a lossless compression format, such as PNG, to render the images and transmit the images to the browser would result in clear images, but would be slow, resulting in increased bandwidth usage and increased latency issues.

When the browser 110 sends a request to the webserver 108*a* for the webpage 122*a* at the domain 120*a*, the remote isolation server 106 prepares to send an image of the requested webpage 122*a* to the browser 110. In some embodiments, the congestion control component 116 may determine whether the congestion level of the wireless transmission link between the webserver 108*a* and the browser 110 exceeds a pre-determined threshold (i.e., the link is too congested). If the congestion level does not exceed the pre-determined threshold (i.e., the link is "clear"), then the remote isolation server 106 will send a visual feed message (i.e., image) of the requested webpage 122*a* to be displayed by the browser 110.

A congestion control mechanism may be implemented by the congestion control component 116 to monitor the number of unacknowledged bytes sent over a wireless communication link between the webserver 108*a* and the browser 110. In some embodiments, each visual feed message may be acknowledged by the local network device 104, with a default maximum number of bytes defined that can be unacknowledged at a specific point in time. The congestion control component 116 may provide an application programming interface (API) to determine a percentage of bytes that remain unacknowledged at a specific time, where the percentage of bytes is determined out of the default maximum number. For example, the maximum number of bytes may be defined to be 1 MB. If the webserver 108*a* (via remote isolation server 106) sends two images to browser 110, with each image being 400 KB in size, the wireless communication link may be determined to be 80% congested. Thus, if the webserver 108*a* wants to send a third image having a size smaller than 200 KB, the congestion control component 116 may determine the image can be sent immediately, as the number of unacknowledged bytes has not surpassed the maximum byte threshold. However, if the third image has a size larger than 200 KB, then the remote isolation server 106 may send the third image once the local network device 104 acknowledges previously sent visual feed messages, bringing the congestion level down.

FIG. 2A shows an example screenshot 200A of webpage 122*a*. As described previously, the user has entered URL 204 into the browser 110 to obtain the webpage 122*a* from the webserver 108*a*. The request may be intercepted by the remote isolation server 106 in order to remotely render images related to the requested webpage 112*a* and to remove executable content which may result in a security threat, such as the malicious content 124*a*. As described previously, the congestion control component 116 may determine whether a wireless transmission link between the webserver 108*a*, the remote isolation server 106, and the browser 110 is sufficiently clear to send remotely rendered images to the browser 110. If it is determined that the wireless transmission link is clear, remote isolation server 106 may send a compressed full screen image 206 of the webpage 122*a* to the browser 110, where the image 206 is free of executable content such as the malicious content 124*a*. In one embodiment, the initial image 206 transmitted to the browser 110 may be a JPG image. The JPG image 206, however, may not provide the highest quality image due to the JPG compression method. However, sending a lossless image such as a PNG image may result in too much congestion over the wireless transmission link, and may result in increased latency and bandwidth usage. Thus, after the initial JPG image 206 is sent, the remote isolation server 106, and the beautification component 118, may operate to increase the quality of the image viewed on the browser 110 without sending overly large files. The remote isolation server 106 may maintain this image 206 in memory in a "client canvas state," where the client canvas state is the most recent, static BMP version of the HTML5 canvas of the browser 110.

As described previously, JPG images are lossy, and thus do not have the highest quality, however, sending a series of lossless PNG images in response to user input may result in excessive congestion and latency. Thus, whenever a newly rendered portion of the screen in the browser 110 is to be sent (e.g., upon a first page load, based on scroll gestures, animations, typing of text into a text bar), a newly rendered JPG image may be sent from the remote isolation server 106, as opposed to a PNG image.

The remote isolation server 106, however, may begin to "beautify" the image 206 using PNG image slices to replace associated portions of the JPG image 206 on the browser 110. The PNG image slices may be transmitted based on the determination of a set of triggers or timer-based operations. In one embodiment, the trigger to begin sending the PNG image slices to "beautify" the webpage 122*a* may be the first page load of the webpage 122*a* or after the first JPG image is first sent to the browser 110. In another embodiment, the trigger may be time-based, and may be, for example, five seconds after the first page load or five seconds after user input, such as a scroll gesture. With each determined trigger, any previous timers may be canceled out. For example, after a scroll gesture, a timer may count to the pre-determined trigger time of five seconds. Once the five second timer elapses, the remote isolation server 106 may access the "client canvas state," prepare a PNG image from the stored copy of the image, and send the PNG image to the browser 110 to replace the associated portions of JPG image 206. If, however, a scroll gesture is determined before the five second timer has elapsed, a new timer may cancel out the original five second timer.

Each "beautified" PNG image may be large in size, perhaps even larger than the maximum number of bytes defined by the congestion control component 116. Thus, if a PNG image is sent from the remote isolation server 106 to the browser 110 after each example five-second timer has elapsed, the congestion of the wireless transmission link may experience a "hiccup." Instead of sending a full screen PNG image, therefore, the beautification component 118 may "slice" the PNG image into slices, such as horizontal or vertical slices. Each of the PNG image slices may be sent separately from the remote isolation server 106. In some embodiments, a pre-determined time delay may be established between the transmissions of each PNG image slice, with the congestion control component 116 determining the congestion of the wireless transmission link between each PNG image slice transmission.

At the time screenshot 200A is taken with reference to FIG. 2A, a slider indicator 212 is located at the top of the scroll bar, implying that screenshot 200A is the first load of webpage 122a and this is a first transmission of the JPG image 206. Thus, a timer may begin after the JPG image 206 is loaded, and after the timer expires, the beautification component 118 may send a PNG image slice determined from the stored image to the browser 110 to replace the associated portion of image 206. A new timer may initiate, and the process may repeat with previously unbeautified portions of image 206 replaced with received PNG image slices.

The user, however, is unlikely to load the webpage 122a and then not interact with the webpage in any way. Thus, the browser 110 may further detect input from a user with respect to the webpage 122a. In some embodiments, the input from the user may include mouse input and/or keyboard input and/or other types of input such as touchscreen input. For example, the browser 110 may detect clicking of a mouse, typing of keys on a keyboard, a pinch and zoom touching input on a touchscreen, movement of the scroll bar or a mouse scroll, and the like. Input from the user may result in the need for the remote isolation server 106 to send a new rendered JPG image portion of the webpage 122a which was not previously seen before the scrolling, as well as new PNG image slices to be sent to beautify the webpage 122a.

Turning to FIG. 2B, webpage 122a is shown after a user input (e.g., scrolling down). In this example, the user input is moving the slider indicator 212 down to access a lower, previously unseen, portion 208 of the webpage 122a. The congestion control component 116 may again make a determination if the wireless transmission link between the webserver 108a and the browser 110 is clear or congested, and if clear, the remote isolation server 106 may send a newly rendered JPG image 206 of the newly accessed portion of the webpage 122a.

The original JPG image 206 may have been sent from remote isolation server 106 to browser 110 and is illustrated as the top portion of the webpage 122a of FIG. 2B. In addition, the top portion of the webpage 122a, which includes the original JPG image 206, may also now include a beautified portion made up of PNG image slice 216. The act of scrolling, however, may result in a request of not-before-seen portion 208 at the bottom of the webpage 122a, where the portion 208 is a newly received remotely rendered JPEG image sent from the remote isolation server 106.

More specifically, the user may request the webpage 122a, where the remote isolation server 106 sends a first full screen JPG image to the browser 110, as illustrated by screenshot 200A of FIG. 2A. The user, however, may scroll down slightly, altering the portion of the webpage 122a displayed in the browser 110, as illustrated by screenshot 200B of FIG. 2B. For example, moving the slider indicator 212 may result in a shift of the webpage 122a down a height of "Y" pixels (e.g., 40 pixels). Because the only change of the webpage 122a is the shift of Y pixels, only the bottom Y height of the webpage 122a (e.g., the portion 208) is new, with the upper portion of image 206 remaining unchanged from the originally sent JPG image. The beautification component 118 may compress and render the new bottom portion 208 of the webpage 122a and send the browser 110 a new JPG image for bottom portion 208.

After a pre-determined time period, or after another trigger is determined, the beautification component 118 may begin beautifying images 206 and 208 by sending a succession of PNG image slices to replace the associated portions of the JPG images. In order to make the beautification process efficient, however, only portions of image 206 not previously beautified may be beautified by the receipt of additional PNG image slices.

In one example, the PNG image slice 216 has been previously sent to the browser 110 to replace the associated portion of the JPG image 206, and thus the region of JPG image 206 replaced by PNG image slice 216 does not need to be beautified again. The beautification component 118, therefore, may keep track of the coordinates and compression type of all images sent to the browser 110 in order to operate more efficiently. In one embodiment, the beautification component 118 may keep track of each image by the identifier:

<region, compression type> where the region is a set of integers corresponding to the X and Y position of the screen, the width X, and the height Y of each image. Thus, the X and Y position of PNG image slice 216, as well as the width X and the height Y of PNG image slice 216, may be stored on the remote isolation server 106.

When the beautification component 118 makes a determination to send another PNG image slice to the browser 110, the beautification component 118 may compare an identifier of the new PNG image slice against the current image stored in the client canvas state (i.e., the combination of JPG and PNG images that make up the webpage 122a at the current time). The beatification component 118 may then remove each portion of the current image that has already been sent to the browser 110. From the remaining portion of the current image, a PNG image slice that does not correspond to a previously beautified region may then be sent from the remote isolation server 106 to the browser 110 to replace a portion of the JPG image 206 or 208. For example, the beautification component may send a second PNG image slice 218 to beautify the new portion 208 of webpage 122a that was uncovered when the user scrolled down.

The beautification method may continue each time a trigger is determined or until all of the webpage has been updated with PNG image slices. By sending only JPG images and PNG image slices of the changed portions or the webpage and/or the portions not previously beautified, the browser 110 may display the shifted webpage as necessary, without re-rendering all of the web data, thus reducing delays caused by latency and bandwidth and mitigating security threats.

In one example, the display device displaying the visible portion of webpage 122a may have an example display resolution of 1920×1080 pixels (width×height). In this example, each PNG image slice may have a dimension equal to 1920 pixels in width, and 108 pixels in height; thus, ten PNG image slices may be needed to completely beautify the images 206 and 208. The client canvas state, stored on remote isolation server 106, may indicate to the beautification component 118 that all of JPG images 206 and 208 have been beautified with PNG image slices, except for a small portion at <0,0> having an example width×height of 10×10 pixels. A trigger may occur, such as the elapsing of the example five-second timer. The dimensions of each of the PNG image slices is generated, however, at this time, the slices are not yet compressed using PNG compression methods. For the first example image slice, beginning at region <0,0> and ending at width x=1919 and height y=9, the beautification component 118 may check to see if there has been a previously beautified section intersected in the client canvas state equal to the first example image slice. The beautification component 118 may determine that the only intersection is the example 10×10 portion described above. Thus, the remote isolation server 106 then compresses the 10×10 portion remaining using the example PNG compression method, and sends the compressed 10×10 portion.

Browser 110 receives the PNG 10×10 image slice and beautifies the corresponding region of webpage 122a. Subsequently, the client canvas state is updated and provides that the region starting at <0,0> and ending at <1919×9> has been beautified. The method then repeats if necessary.

Figure 3:
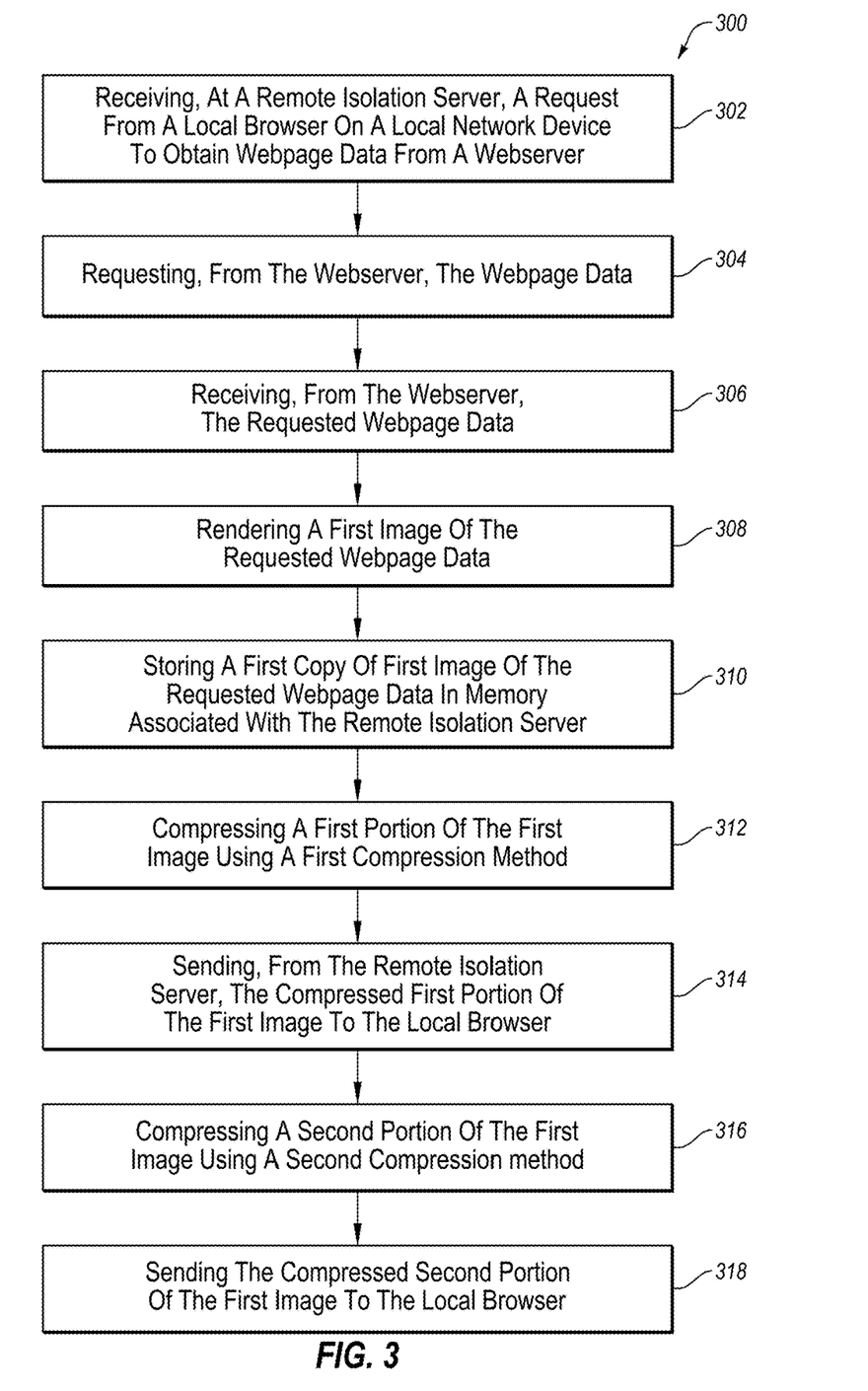
FIG. 3 is a flowchart of an example method for image quality optimization during remote isolated sessions.

FIG. 3 is a flowchart of an example method 300 for image quality optimization during remote isolated sessions. The method may be performed, in some embodiments, by a device or system, such as by any of the webservers 108a-108n, by the remote isolation server 106 (including any of security component 114, congestion control component 116, and/or beautification component 118), and by the browser 110 on the local network device 104. In these and other embodiments, the method 300 may be performed by one or more processors based on one or more computer-readable instructions stored on one or more non-transitory computer-readable media. The method 300 will now be described in connection with FIGS. 1, 2A-2B, and 3.

The method may include, at action 302, receiving, at a remote isolation server, a request from a local browser on a local network device to obtain webpage data from a webserver. For example, the remote isolation server 106 may intercept a request sent from browser 110 for webpage 122a intended for webserver 108a.

The method may include, at action 304, requesting, from the webserver, the webpage data. For example, the remote isolation server 106 may request from the webserver 108a, the requested webpage data for webpage 122a.

The method may include, at action 306, receiving, from the webserver, the requested webpage data. For example, the remote isolation server 106 may receive, from the webserver 108a, the requested webpage data for webpage 122a.

The method may include, at action 308, rendering a first image of the requested webpage data. For example, beautification component 118 may create a BMP file representative of the webpage data for webpage 122a.

The method may include, at action 310, storing a first copy of first image of the requested webpage data in memory associated with the remote isolation server. For example, remote isolation server 106 may store a static BMP version of the HTML5 canvas for the webpage 122a in a client canvas state.

The method may include, at action 312, compressing a first portion of the first image using a first compression method. For example, the beautification component 118 may compress a portion of the webpage 122a to be displayed as a first page load in a JPG format.

The method may include, at action 314, sending, from the remote isolation server, the compressed first portion of the first image to the local browser. For example, the JPG image 206 may be sent from the remote isolation server 106 to the browser 110 for display to a user on the local network device 104.

The method may include, at action 316, compressing a second portion of the first image using a second compression method. For example, the beautification component 118 may compress a portion of the webpage data as a PNG image slice, such as the PNG image slice 216.

The method may include, at action 318, sending the compressed second portion of the first image to the local browser. For example, the PNG image slice 216 may be sent from remote isolation server 106 to the browser 110 for display to a user on the local network device 104. In some example, the PNG image slice 216 may replace a portion of the JPG image 206 displayed on the browser 110.

Although the actions of the method 300 are illustrated in FIG. 3 as discrete actions, various actions may be divided into additional actions, combined into fewer actions, reordered, expanded, or eliminated, depending on the desired implementation.

Further, it is understood that the method 300 may improve the functioning of a computer system itself. For example, the functioning of local network device 104 and/or the remote isolation server 106 of FIG. 1 may itself be improved by the method 300. In one embodiment, the local network device 104 and/or the remote isolation server 106 may be improved by the method 300 because the remote isolation server may reliably exclude the malicious content 124a from the webpage 108a, and thus also reliably exclude the malicious content 124a from the subsequent display by the browser 110 of the example JPG images 206 and 208, as well as example PNG image slices 216 and 218, thus allowing the remote isolation server 106 to protect the local network device 104 from the malicious content 124a. Furthermore, by remotely rendering images of the webpage 122a using the method 300, the congestion of communications via network 102 may be reduced.

Also, the method 300 may improve the technical field of remote webpage browsing. For example, by the method 300 remotely rendering images associated with a requested webpage to reliably exclude any malicious content from the webpage video stream, as well as reducing latency and bandwidth usage, while still providing high quality images, the method 300 is an improvement over conventional methods of remote webpage browsing.

FIG. 4 illustrates an example computer system 400 that may be employed in image quality optimization during remote isolated sessions. In some embodiments, the computer system 400 may be part of any of the systems or devices described in this disclosure. For example, the computer system 400 may be part of any of the local network device 104, the remote isolation server 106, and/or any of the webservers 108a-108n of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, and/or in one or more components including, but not limited to, the browser 110, the security component 114, the congestion control component 116, and/or the beautification component 118.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as any one of the browser 110, the security component 114, the congestion control component 116, and/or the beautification component 118.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for image quality optimization during remote isolated sessions, at least a portion of the method being performed by a remote isolation server comprising one or more processors, the method comprising:
   (a) receiving, at the remote isolation server, a request from a local browser on a local network device to obtain webpage data from a webserver;
   (b) requesting, to the webserver, the webpage data;
   (c) receiving, from the webserver, the requested webpage data;
   (d) rendering the requested webpage data as an image having a first lossless format;
   (e) storing a copy of the image of the requested webpage data in memory associated with the remote isolation server;
   (f) compressing a first portion of the image using a first lossy compression format;
   (g) sending, from the remote isolation server, the compressed first portion of the image to the local browser;
   (h) compressing a second portion of the image using a second compression format that is different from the first lossy compression format, the second portion of the image being a second horizontal slice or vertical slice of the image configured to span all the way across a viewing area of a browser horizontally or vertically but not horizontally and vertically, and wherein a horizontal slice or vertical slice of the first portion of the image is replaceable with the second horizontal slice or vertical slice of the image corresponding to the region of the first portion of the image; and
   (i) sending the compressed second portion of the image to the local browser.

2. The method of claim 1, wherein rendering the requested webpage data as the image having the first lossless format comprises:
   rendering a bitmap image of the webpage data.

3. The method of claim 1, further comprising:
   prior to rendering the requested webpage data as the image, executing any executable content contained in the webpage data.

4. The method of claim 1, wherein compressing the first portion of the image using the first lossy compression format further comprises:
   producing a JPG file.

5. The method of claim 1, wherein compressing the second portion of the image using the second compression format further comprises:
   compressing the second portion of the image using a second lossless compression format.

6. The method of claim 5, wherein compressing the second portion of the image using the second lossless compression format further comprises:
   producing a PNG file.

7. The method of claim 1, further comprising:
   prior to sending the compressed first portion of the image to the local browser, determining that a congestion level of a wireless communication link between the remote isolation server and the local network device satisfies a pre-determined threshold, wherein sending the compressed first portion of the image is based on determining the congestion level satisfies the pre-determined threshold.

8. The method of claim 1, further comprising:
   in response to a trigger communication received from the local browser, compressing a third portion of the image using the second compression format; and
   sending the compressed third portion of the image to the local browser.

9. The method of claim 1, further comprising:
   updating the copy of the image after compressing the first portion of the image and compressing the second portion of the image; and
   storing the updated copy in the memory associated with the remote isolation server.

10. The method of claim 1, wherein:
    the requested webpage data comprises webpage text and webpage images; and the rendering of the requested webpage data as the image comprises rendering the webpage text and the webpage images together in the image.

11. A computer-implemented method for image quality optimization during web isolated sessions, at least a portion of the method being performed by a local browser on a local network device, the local network device comprising one or more processors, the method comprising:
  (a) sending a request to obtain webpage data from a webserver;
  (b) receiving a first portion of the requested webpage data rendered as an image from a remote isolation server, the first portion of the image compressed by a first compression format;
  (c) decompressing the first portion of the image;
  (d) receiving a second horizontal slice or vertical slice of the image from the remote isolation server, the second horizontal slice or vertical slice of the image compressed by a second compression format that is different from the first compression format, the second horizontal slice or vertical slice of the image configured to span all the way across a viewing area of a browser horizontally or vertically but not horizontally and vertically;
  (e) decompressing the second horizontal slice or vertical slice of the image; and
  (f) replacing a horizontal slice or vertical slice of the first portion of the image with the second horizontal slice or vertical slice of the image corresponding to the region of the first portion of the image.

12. The method of claim 11, further comprising:
detecting a user input at the local browser, wherein the user input requests a different portion of the webpage data than the first portion of the image and the second horizontal slice or vertical slice of the image.

13. The method of claim 12, wherein detecting the user input comprises: detecting one or more of mouse input, keyboard input, and touchscreen input.

14. The method of claim 12, further comprising:
receiving a third horizontal slice or vertical slice of the image from the remote isolation based on detecting the user input, the third horizontal slice or vertical slice of the image compressed by one of the first compression format and the second compression format.

15. The method of claim 11, further comprising:
receiving a third portion of the image from the remote isolation server based on an expiration of a timer, the third portion of the image compressed by one of the first compression format and the second compression format.

16. The method of claim 15, further comprising:
if the third portion of the image is compressed by the second compression format, replacing a second region of the first portion of the image with the third portion of the image corresponding to the second region of the first portion of the image.

17. The method of claim 11, wherein the first portion of the image is compressed by a lossy compression format.

18. The method of claim 17, wherein the second horizontal slice or vertical slice of the image is compressed by a lossless compression format.

19. One or more non-transitory computer-readable media comprising one or more computer-readable instructions that, when executed by one or more processors of a remote isolation server, cause the remote isolation server to perform a method for image quality optimization during remote isolated sessions, the method comprising:
  (a) receiving, at the remote isolation server, a request from a local browser on a local network device to obtain webpage data from a webserver;
  (b) requesting, to the webserver, the webpage data;
  (c) receiving, from the webserver, the requested webpage data;
  (d) rendering the requested webpage data as an image;
  (e) storing a copy of the image of the requested webpage data in memory associated with the remote isolation server;
  (f) compressing a first portion of the image using a first compression format;
  (g) sending, from the remote isolation server, the compressed first portion of the image to the local browser;
  (h) compressing a second portion of the image using a second compression format that is different from the first compression format, the second portion of the image being a second horizontal slice or vertical slice of the image configured to span all the way across a viewing area of a browser horizontally or vertically but not horizontally and vertically, and wherein a horizontal slice or vertical slice of the first portion of the image is replaceable with the second horizontal slice or vertical slice of the image corresponding to the region of the first portion of the image; and
  (i) in response to expiration of a timer-based trigger, sending the compressed second portion of the image to the local browser.

\* \* \* \* \*